US005716440A

United States Patent [19]
Andou

[11] Patent Number: 5,716,440
[45] Date of Patent: *Feb. 10, 1998

[54] BIODEGRADABLE MOLDED ARTICLES

[75] Inventor: Sadamasa Andou, Minoo, Japan

[73] Assignee: Nissei Kabushiki Kaisha, Osaka, Japan

[*] Notice: The term of this patent shall not extend beyond the expiration date of Pat. No. 5,470,382.

[21] Appl. No.: 476,239

[22] Filed: Jun. 7, 1995

Related U.S. Application Data

[62] Division of Ser. No. 18,988, Feb. 18, 1993, Pat. No. 5,470,382.

[30] Foreign Application Priority Data

Feb. 19, 1992 [JP] Japan ..................................... 4-32215

[51] Int. Cl.$^6$ .......................... C08L 89/04; C08L 91/00; C08L 99/00
[52] U.S. Cl. ..................... 106/124.1; 106/125.1; 106/126.1; 106/126.3; 106/135.1; 106/136.1; 106/144.1; 106/144.4; 106/144.72; 106/145.1; 106/145.3; 106/146.1; 106/146.3; 106/146.5; 106/148.1; 106/148.52; 106/156.5; 106/156.51; 106/158.1; 106/159.1; 106/160.1; 106/162.1; 106/163.01; 106/203.02; 106/205.01; 106/205.5; 106/205.72; 106/206.1; 106/215.5; 106/217.7; 106/243; 106/244; 106/250; 106/251; 106/252; 106/253; 426/138; 426/512; 264/330; 428/34.1
[58] Field of Search ............... 106/124, 138-140, 106/142, 143, 147-151, 153, 154.1, 157-159, 161-162, 163.1, 199, 203-206, 208-211, 213-215, 217, 243, 244, 250-253, 266, 124.1, 125.1, 126.1, 126.3, 135.1, 136.1, 144.1, 144.4, 144.72, 145.1, 145.3, 146.1, 146.3, 146.5, 148.1, 148.52, 156.5, 156.51, 158.1, 159.1, 160.1, 162.1, 163.01; 426/138, 512; 264/330; 428/34.1; 106/203.02, 205.01, 205.5, 205.72, 206.1, 215.5, 217.7

[56] References Cited

U.S. PATENT DOCUMENTS 4,700,622   10/1987   Satake .

FOREIGN PATENT DOCUMENTS

| | | |
|---|---|---|
| 0319255 | 6/1989 | European Pat. Off. . |
| 0359285 | 3/1990 | European Pat. Off. . |
| 2611583 | 9/1988 | France . |
| 3820828 | 12/1989 | Germany . |
| 3937168 | 5/1991 | Germany . |
| 4009408 | 9/1991 | Germany . |
| 2-67109 | 3/1990 | Japan . |
| 581729 | 10/1946 | United Kingdom . |
| 588354 | 5/1947 | United Kingdom . |
| 2190093 | 11/1987 | United Kingdom . |

OTHER PUBLICATIONS

Shoten, Asakura, "The Residues From Producing Starch", Handbook of Starch Science pp. 304 and 320 (1979) no month.

"The Residues Resulting From Removing Oil From Soybean, Corn And Rapeseed", Handbook of Chemistry, Maruzen Co. Ltd (1984) no month.

Porter, Norman, "Sources OF Fats and Oils", Food Science, Fourth Edition (1986) no month.

*Primary Examiner*—Anthony Green
*Attorney, Agent, or Firm*—Jordan and Hamburg

[57] ABSTRACT

A biodegradable molded article produced by molding under pressure a residue remaining after taking out essential portions of effective elements in foods, and/or in materials thereof, such as lees of Sake, squeezed and strained lees of fruits, etc. This enables the residues to be effectively re-utilized by producing therefrom molded articles which can be used in a variety of fields. As being biodegradable, the molded article also permits an easy disposal without creating the environmental problem.

40 Claims, No Drawings

BIODEGRADABLE MOLDED ARTICLES

This is a division of application Ser. No. 08/018,988, filed Feb. 18 1993 now U.S. Pat. No. 5,470,382.

The present invention relates to biodegradable molded articles obtained by effectively re-utilizing residues remaining after taking out essential portions of effective elements in foods, such as vegetables, fruits, grains, etc., and/or in materials of the above foods.

BACKGROUND OF THE INVENTION

Recently, a variety of beverages and processed foods are being produced from foods such as vegetables, fruits, grains, etc. However, the production of the above beverages and processed foods results in a large amount of residues remaining after taking out essential portions of the effective elements. Normally, the residues are either disposed of as wastes or re-utilized as feed for animals.

Conventionally, as to the materials for the containers, wrapping materials, etc., plastics such as foamed polystyrene are generally used.

The amount of residues remaining after taking out essential portions of the effective element of a variety of foods shows a yearly increase. However, there is a limit in re-utilizing the residues as the feed for animals. Therefore, a method for effectively producing industrial products from the residues is desired.

Furthermore, plastics such as foamed polystyrene used for the containers, wrapping materials, etc., have the following problems: the biodegradability thereof is extremely low; and a toxic gas may be generated during the process of incineration. Thus, the difficulties in the waste disposal (burying, incinerating, etc.) of the plastics present serious social problems.

SUMMARY OF THE INVENTION

An object of the present invention is to provide biodegradable molded articles obtained by effectively re-utilizing residues remaining after taking out essential portions of effective elements from foods, such as vegetables, fruits, grains, etc., and/or from materials used in the above foods, the biodegradable molded articles enabling an easy waste disposal without creating environmental problems.

In order to achieve the above object, biodegradable molded articles of the present invention are characterized in that they are obtained from residues remaining after taking out essential portions of effective elements from foods and/or from materials used in the foods by molding the residues under pressure.

Conventionally, the residues were either disposed of as wastes or re-processed as feed for animals. In pursuit of the more effective re-utilization of the residues, the above arrangement of the present invention enables molded articles, which can be used in a variety of fields, to be obtained. Furthermore, because the molded articles are biodegradable, they are easily decomposed by microbes, bacteria, etc., in the soil. Thus, the biodegradable molded articles of the present invention permit an elimination of the problem existing in the waste disposal of the conventional containers made of plastics.

In order to achieve the above object, another type of biodegradable molded article of the present invention is characterized in that it is obtained by molding a mixture under pressure, the mixture being composed of residues, remaining after taking out essential portions of effective elements from foods and/or from materials used in the foods, and a binding agent.

Besides the above effect of the biodegradable molded articles obtained by molding the residues under pressure, additional effects can be achieved for certain compositions of the materials by mixing with the binding agent. For example, biodegradable molded articles with improved working efficiencies in the producing processes, such as a process for pouring the materials into molds, and biodegradable molded articles with better moldability and homogeneous structure can be achieved.

For a fuller understanding of the nature and advantages of the invention, reference should be made to the ensuing detailed description.

DETAILED DESCRIPTION OF THE EMBODIMENTS

As to residues remaining after taking out essential portions of effective elements from foods, and/or from materials used in the foods, for example, the following residues may be used. Here, it should be noted that the present invention is not limited to the following residues.

(1) Squeezed and strained residues resulting from producing, or processing foods made of vegetables or fruits such as celery, carrot, tomato, citrus fruits (orange, lemon, grapefruit, etc.), apple, grape, berries, pineapple, sugar cane, sugar beet, etc.

(2) Residues resulting from producing processed foods made from grains (for example, bean curd), or producing liquors (Sake, distilled spirits, beer, etc. ) from grains.

(3) Extractive residues of table luxuries (coffee, tea, ptisan, green tea, oolong tea, etc.), or extracted tea leaves (4) Residues resulting from removing oil by squeezing, pressing, or extracting soybean, corn, rapeseed, sesame, etc.

(5) Residues such as wheat bran, rice bran, rice hull, etc. resulting from refining grains, or residues such as gluten meal resulting from producing starch.

(6) Residues such as crumbs of biscuit, cone cups, etc., resulting from producing confectioneries.

(7) Mixtures of the above residues

In addition, the above residues may be used after being processed for drying, grinding, etc., if necessary.

In producing the molded articles, residues are placed in a desired shaped mold and then a pressure is applied. Here, the pressure may be set according to the strengths etc., of the molded articles required for the usages thereof, preferably in the range of 0.5–500 kg/cm$^2$. A press time is not specified, and a pressure may be applied either instantaneously, or for a predetermined time, preferably set in the range of 0.5 seconds–10 minutes, more preferably in the range of 5–300 seconds. Although a molding temperature is not specified, considering working efficiency, or moldability in producing the molded articles, it is preferably set in the range of 30°–300° C., more preferably in the range of 50°–200° C.

In pursuit of obtaining improved strengths of the molded articles, the molded articles of the present invention may be produced by mixing auxiliary materials, such as powdered grains, cellulose, insoluble minerals, seasoning matters, salts, powdered bones, shells, or egg shells, etc., with the residues of the above foods or of materials used in the above foods.

Suitable binding agents include, for example, water, plasticizers, emulsifying agents, fats and oils, saccharides, proteins, starches, thickening polysaccharides, and the mixtures of the above.

For more concrete examples of the above binding agent, such plasticizers as glycerin, polyglycerin, ethylene glycol, or propylene glycol may be used. Suitable emulsifying agents include monoglycerides, derivatives of monoglyceride, sugar esters, propylene glycol esters, esters of fatty acid with polyglycerin, and esters of fatty acid with sorbitan, etc.

Suitable fats and oils include, for example, plant or animal fats and oils, and hardened or mixed fats and oils. Suitable saccharides include, for example, monosaccharides such as glucose, fructose, disaccharides such as sucrose, maltose, lactose, etc., sugar alcohols such as sorbitol, maltitol, etc., oligosaccharides, thick malt syrups, dextrins, isomeric saccharides, and the mixtures of the above.

Suitable proteins include plant or animal proteins such as soybean protein, egg white, corn protein, casein, milkserum protein, wheat protein, collagen, etc., and the mixtures of the above proteins.

Suitable starches include those of corn, potato, tapioca, sweet potato, wheat, etc., α-starches or denatured starches of the above, and the mixtures of the above starches.

Suitable thickening polysaccharides include xanthan gum, locust bean gum, guar gum, pectin, gellan gum, arabic gum tamarindus gum, carrageenan, karaya gum, tara gum, and the mixtures of the above.

The molded articles of the present invention can be used as the containers for hamburger, hot dog, French fried potato, deep fried chicken, Takoyaki, sausage, rice cake, ice cream, Chinese noodle, Japanese noodle, vegetables, fruits, meats, fishes, dried foods, etc. Not only the containers for foods, the molded articles of the present invention can be used in a variety of fields, such as flowerpots, golf tees, wrapping materials, garbage boxes, chopsticks, folding fans, etc.

The molded articles made of the above materials are biodegradable, and thus they are easily decomposed by microbes, bacteria, etc., in the soil. Additionally, although the period required for the decomposition differs depending on the materials used in the molded articles, it is generally in the range of substantially 2-4 weeks.

After being used, the molded articles may be disposed of in the soil, and for certain materials of the molded articles, the used molded articles may be used as feed for animals. Moreover, when the molded articles are used as the containers for foods, by improving the flavors, appearances, etc., the molded articles may be arranged so as to be edible together with the foods.

The following will discuss a method for producing a molded article step by step in accordance with the present invention.

EXAMPLE 1

First, 100 parts by weight of residues of Sake was poured into a mold which had been heated to 150° C., and molded under the pressure of 50 kg/cm² for 60 seconds. Thereafter, it is taken out from the mold, and then cooled off at room temperature, thereby obtaining a molded article (A).

The obtained molded article (A) had a smooth surface and good flavor.

This example proved that the residues of Sake, i.e., a by-product resulted from brewing Sake, could be effectively re-utilized by producing therefrom the molded article through the process of pressure molding. Because the molded article is biodegradable, it is easily decomposed by microbes, bacteria, etc., in the soil. This advantage can be realized, for example, when the molded articles are used for disposable tablewares. The conventional disposable tablewares were not easily decomposed, and thus they were not suitable for restaurants' use. As described, the molded article of the present embodiment permits an elimination of the disposal problem, and also saves time which would be taken up by dish washing.

Additionally, the usage of the molded article of the present embodiment is not limited to the disposable tablewares.

The molded article can be used in a wider field, as the desired strength, shape, etc., can be obtained by changing the molding conditions, such as a pressing condition, heating temperature, etc., or by selecting a suitable type of mold.

EXAMPLE 2

Squeezed and strained residues of orange, egg white (binding agent), and water (binding agent) were prepared in the proportion shown in Table 1. Then, the materials were mixed using a mixer for two minutes.

TABLE 1

| Material | Parts by Weight |
| --- | --- |
| Squeezed and Strained Residues of Orange | 100 |
| Egg White | 10 |
| Water | Suitable Amount* |

*Water is preferably added so that the parts by weight thereof in the mixture is in the range of 5–50 weight %

A predetermined weight of the mixture was poured into a mold which had been heated to 150° C., and molded under the pressure of 50 kg/cm² for 30 seconds. Then, the product was taken out from the mold, and then cooled off at room temperature, thereby obtaining a molded article (B).

The obtained molded article (B) had a better moldability and homogeneous structure, and a smooth and glossy surface.

This example proved that by mixing the squeezed and strained residues of orange with the egg white and water (binding agents), the molded article permitting an improved re-utilization can be obtained, which were conventionally either re-utilized as feed for animals or disposed as wastes. Furthermore, the addition of the egg white and water (binding agents) enables the working efficiency in the molding process to be improved, and also enables the molded article (B) to have an improved moldability and a homogeneous structure. Like the molded article (A) of example 1, the molded article (B) of this example can be used in a variety of fields. After being used, the molded article (B) may be re-utilized as feed for animals. Moreover, the molded article (B) enables an easy disposal by burying it into the soil, since the used molded article (B) can be easily decomposed by microbes, bacteria, etc. in the soil.

EXAMPLE 3

Residues of bean curd as a residue resulted from producing bean curd and glycerin (plasticizer) as a binding agent were prepared in the proportion shown in Table 2. Then, the materials were homogeneously mixed using a mixer.

TABLE 2

| Material | Parts by Weight |
| --- | --- |
| Residues of Bean Curd | 100 |
| Glycerin | 20 |

A predetermined weight of the mixture was poured into a mold which had been heated to 150° C., and molded under the pressure of 50 kg/cm² for 60 seconds. Thereafter, the product was taken out from the mold, and then cooled off at room temperature, thereby obtaining a molded article. The obtained molded article had a better moldability and homogeneous structure.

EXAMPLE 4

Residues of bean curd as a residue resulted from producing bean curd, glycerin (binding agent), and egg white (binding agent) were prepared in the proportion shown in Table 3, and homogeneously mixed using a mixer.

TABLE 3

| Material | Parts by Weight |
| --- | --- |
| Residues of Bean Curd | 100 |
| Egg White | 10 |
| Glycerin | 20 |

A predetermined weight of the mixture was poured into a mold which had been heated to 150° C., and molded under the pressure of 50 kg/cm² for 60 seconds. Thereafter, the product was taken out from the mold, and then cooled off at room temperature, thereby obtaining a molded article. The obtained molded article had a better moldability and homogeneous structure.

EXAMPLE 5

Residues of Sake, glycerin (binding agent), and unrefined soybean oil (binding agent) were prepared in the proportion shown in Table 4, and homogeneously mixed using a mixer.

TABLE 4

| Material | Parts by Weight |
| --- | --- |
| Residues of Sake | 120 |
| Glycerin | 10 |
| Unrefined Soybean Oil | 6 |

A predetermined weight of the mixture was poured into a mold which had been heated to 130° C., and molded under the pressure of 50 kg/cm² for 60 seconds. Thereafter, the product was taken out from the mold, and then cooled off at room temperature, thereby obtaining a molded article. The obtained molded article had a better moldability and homogeneous structure.

EXAMPLE 6

Squeezed and strained residues of orange, glycerin (binding agent), unrefined soybean oil (binding agent), starch (binding agent), and water (binding agent) were prepared in the proportion shown in Table 5, and homogeneously mixed using a mixer.

TABLE 5

| Material | Parts by Weight |
| --- | --- |
| Squeezed and Strained Residues of Orange | 100 |
| Glycerin | 20 |
| Unrefined Soybean Oil | 2 |
| Starch | 5 |
| Water | 7 |

A predetermined weight of the mixture was poured into a mold which had been heated to 150° C., and molded under the pressure of 50 kg/cm² for 60 seconds. Thereafter, the product was taken out from the mold, and then cooled off at room temperature, thereby obtaining a molded article. The obtained molded article had a better moldability and homogeneous structure.

EXAMPLE 7

Squeezed and strained residues of orange, glycerin (binding agent), unrefined soybean oil (binding agent), starch (binding agent), and sorbitol (binding agent) were prepared in the proportion shown in Table 6, and homogeneously mixed using a mixer.

TABLE 6

| Material | Parts by Weight |
| --- | --- |
| Squeezed and Strained Residues of Orange | 100 |
| Glycerin | 20 |
| Unrefined Soybean Oil | 3 |
| Starch | 5 |
| Sorbitol | 30 |

A predetermined weight of the mixture was poured into a mold which had been heated to 150° C., and molded under the pressure of 50 kg/cm² for 60 seconds. Thereafter, the product was taken out from the mold, and then cooled off at room temperature, thereby obtaining a molded article. The obtained molded article had a better moldability and homogeneous structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A biodegradable molded article comprising:
   residues remaining from grain following processing of the grain during at least one of grain refining, production of sake, brewing of beer, and distillation of spirits;
   a binding agent; and
   said residues and said binding agent being molded under pressure in a range of 0.5 to 500 kg/cm² at a temperature in a range of 30° to 300° C. for a time period in a range of 0.5 to 600 seconds.

2. The biodegradable molded article as set forth in claim 1, wherein the binding agent is water.

3. The biodegradable molded article as set forth in claim 1, wherein the binding agent is a plasticizer.

4. The biodegradable molded article as set forth in claim 1, wherein the binding agent is an emulsifier.

5. The biodegradable molded article as set forth in claim 1, wherein the binding agent is a combination of fats and oils.

6. The biodegradable molded article as set forth in claim 1, wherein the binding agent is a saccharide.

7. The biodegradable molded article as set forth in claim 1, wherein the binding agent is a protein.

8. The biodegradable molded article as set forth in claim 1, wherein the binding agent is a starch.

9. The biodegradable molded article as set forth in claim 1, wherein the binding agent is a polysaccharide.

10. The biodegradable molded article as set forth in claim 1, wherein the binding agent is a mixture composed of at least two binding materials selected from the group consisting of water, plasticizers, emulsifiers, fats and oils, saccharides, proteins, starches, and polysaccharides.

11. A biodegradable molded articles comprising:

residues resulting from the removal of oil from one of soybean, corn, rapeseed, and sesame;

a binding agent; and said residues and said binding agent being molded under pressure in a range of 0.5 to 500 kg/cm$^2$ at a temperature in a range of 30° to 300° C. for a time period in a range of 0.5 to 600 seconds.

12. The biodegradable molded article as set forth in claim 11, wherein the binding agent is water.

13. The biodegradable molded article as set forth in claim 11, wherein the binding agent is a plasticizer.

14. The biodegradable molded article as set forth in claim 11, wherein the binding agent is an emulsifier.

15. The biodegradable molded article as set forth in claim 11, wherein the binding agent is a combination of fats and oils.

16. The biodegradable molded article as set forth in claim 11, wherein the binding agent is a saccharide.

17. The biodegradable molded article as set forth in claim 11, wherein the binding agent is a protein.

18. The biodegradable molded article as set forth in claim 11, wherein the binding agent is a starch.

19. The biodegradable molded article as set forth in claim 11, wherein the binding agent is a polysaccharide.

20. The biodegradable molded article as set forth in claim 11, wherein the binding agent is a mixture composed of at least two binding materials selected from a group consisting of water, plasticizers, emulsifiers, fats and oils, saccharides, proteins, starches, and polysaccharides.

21. A biodegradable molded article comprising:

at least one of squeezed and strained residues resulting from processing citrus fruits, residues resulting from processing soybeans to produce bean curd, residues resulting from the production of sake, residues remaining from extraction processing of one of teas and coffees, residues remaining from grain following processing of the grain during at least one of grain refining, production of sake, brewing of beer, and distillation of spirits, and residues resulting from the removal of oil from at least one of soybean, corn, rapeseed, and sesame;

a binding agent; and said residues and said binding agent being molded under pressure in a range of 0.5 to 500 kg/cm$^2$ at a temperature in a range of 30° to 300° C. for a time period in a range of 0.5 to 600 seconds.

22. The biodegradable molded article as set forth in claim 21, wherein the binding agent is water.

23. The biodegradable molded article as set forth in claim 21, wherein the binding agent is a plasticizer.

24. The biodegradable molded article as set forth in claim 21, wherein the binding agent is an emulsifier.

25. The biodegradable molded article as set forth in claim 21, wherein the binding agent is a combination of fats and oils.

26. The biodegradable molded article as set forth in claim 21, wherein the binding agent is a saccharide.

27. The biodegradable molded article as set forth in claim 21, wherein the binding agent is a protein.

28. The biodegradable molded article as set forth in claim 21, wherein the binding agent is a starch.

29. The biodegradable molded article as set forth in claim 21, wherein the binding agent is a polysaccharide.

30. The biodegradable molded article as set forth in claim 21, wherein the binding agent is a mixture composed of at least two binding materials selected from the group consisting of water, plasticizers, emulsifiers, fats and oils, saccharides, proteins, starches, and polysaccharides.

31. A biodegradable molded article comprising:

one of squeezed and strained residues resulting from processing citrus fruits, celery, carrot, tomato, apple, grape, berries, and pineapple, residues resulting from processing soybeans to produce bean curd, residues resulting from at least one of production of sake, brewing of beer, and distillation of spirits, residues remaining from extraction processing of one of teas, coffees and mixtures thereof, residues remaining from grain following processing of the grain during at least one of grain refining, production of sake, brewing of beer, and distillation of spirits, residues resulting from the removal of oil from at least one of soybean, corn, rapeseed, and sesame, residues resulting from producing starch, and residues including crumbs of biscuits and cone cups resulting from producing confectioneries;

a binding agent; and said residues and said binding agent being molded under pressure in a range of 0.5 to 500 kg/cm$^2$ at a temperature in a range of 30° to 300° C. for a time period in a range of 0.5 to 600 seconds.

32. The biodegradable molded article as set forth in claim 31, wherein the binding agent is water.

33. The biodegradable molded article as set forth in claim 31, wherein the binding agent is a plasticizer.

34. The biodegradable molded article as set forth in claim 31, wherein the binding agent is an emulsifier.

35. The biodegradable molded article as set forth in claim 31, wherein the binding agent is a combination of fats and oils.

36. The biodegradable molded article as set forth in claim 31, wherein the binding agent is a saccharide.

37. The biodegradable molded article as set forth in claim 31, wherein the binding agent is a protein.

38. The biodegradable molded article as set forth in claim 31, wherein the binding agent is a starch.

39. The biodegradable molded article as set forth in claim 31, wherein the binding agent is a polysaccharide.

40. The biodegradable molded article as set forth in claim 31, wherein the binding agent is a mixture composed of at least two binding materials selected from the group consisting of water, plasticizers, emulsifiers, fats and oils, saccharides, proteins, starches, and polysaccharides.

* * * * *